United States Patent
Yang et al.

(12)

(10) Patent No.: US 8,712,883 B1
(45) Date of Patent: Apr. 29, 2014

(54) SYSTEM AND METHOD FOR DYNAMIC QUALITY-OF-SERVICE-BASED BILLING IN A PEER-TO-PEER NETWORK

(75) Inventors: Yongqi Yang, Bellevue, WA (US); Xinyan Zhang, Nanjing (CN)

(73) Assignee: Roxbeam Media Network Corporation, Road Town, Tortola (VG)

( * ) Notice: Subject to any disclaimer, the term of this patent is extended or adjusted under 35 U.S.C. 154(b) by 1587 days.

(21) Appl. No.: 11/452,035

(22) Filed: Jun. 12, 2006

(51) Int. Cl.
*G07F 19/00* (2006.01)

(52) U.S. Cl.
USPC ............... 705/34; 705/7.14; 705/29; 705/35; 705/40; 375/240

(58) Field of Classification Search
None
See application file for complete search history.

(56) References Cited

U.S. PATENT DOCUMENTS

| | | | | |
|---|---|---|---|---|
| 5,434,913 A * | 7/1995 | Tung et al. | ............... | 379/202.01 |
| 6,041,307 A * | 3/2000 | Ahuja et al. | ...................... | 705/8 |
| 6,125,398 A * | 9/2000 | Mirashrafi et al. | ............. | 709/236 |
| 6,169,748 B1 * | 1/2001 | Barbas et al. | ................... | 370/468 |
| 6,857,020 B1 * | 2/2005 | Chaar et al. | ................... | 709/226 |
| 6,859,460 B1 * | 2/2005 | Chen | ............................... | 370/412 |
| 6,996,722 B1 * | 2/2006 | Fairman et al. | ................. | 713/192 |
| 7,027,456 B1 * | 4/2006 | Chen | ............................... | 370/412 |
| 7,133,368 B2 * | 11/2006 | Zhang et al. | ................... | 370/249 |
| 7,280,768 B2 * | 10/2007 | Zaacks et al. | ................. | 398/193 |
| 7,289,506 B1 * | 10/2007 | Hannuksela | ................... | 370/394 |
| 7,315,892 B2 * | 1/2008 | Freimuth et al. | ............... | 709/224 |
| 7,320,131 B1 * | 1/2008 | O'Toole, Jr. | ................... | 718/104 |
| 7,433,835 B2 * | 10/2008 | Frederick et al. | ................ | 705/26 |
| 7,441,267 B1 * | 10/2008 | Elliott | ............................. | 726/13 |
| 7,512,796 B2 * | 3/2009 | Haverinen et al. | ............. | 713/168 |
| 7,633,949 B2 * | 12/2009 | Zadikian et al. | .............. | 370/396 |
| 7,688,853 B2 * | 3/2010 | Santiago et al. | ............... | 370/468 |
| 7,724,700 B1 * | 5/2010 | Grayson et al. | ................ | 370/328 |
| 2002/0120728 A1 * | 8/2002 | Braatz et al. | ................... | 709/223 |
| 2002/0186661 A1 * | 12/2002 | Santiago et al. | .............. | 370/252 |
| 2005/0052992 A1 * | 3/2005 | Cloonan et al. | ................ | 370/229 |
| 2005/0166135 A1 * | 7/2005 | Burke et al. | ................. | 715/500.1 |
| 2008/0004904 A1 * | 1/2008 | Tran | ................................. | 705/2 |
| 2008/0104647 A1 * | 5/2008 | Hannuksela | ................... | 725/114 |

OTHER PUBLICATIONS

W. R. Stevens, "TCP/IP Illustrated," vol. 1, Ch. 1 et seq., Addison-Wesley (1994).

X. Zhang et al., "Coolstreaming/DONet: A Data-driven Overlay Network for Peer-to-Peer Live Media Streaming," INFOCOM 2005, 24th Ann. Jt. Conf of the IEEE Comp. and Comm. Societies, Proc. IEEE vol. 3, 13-17, pp. 2102-2111 (Mar. 2005).

\* cited by examiner

*Primary Examiner* — Fateh Obaid

(74) *Attorney, Agent, or Firm* — Shun Yao; Park, Vaughan, Fleming & Dowler LLP

(57) ABSTRACT

A system and method facilitate dynamic QoS-based billing in a P2P network. According to one embodiment, a peer node identifies a plurality of partner peer nodes that transiently stage streaming media data the peer node requests and receives from the partner peer nodes. The peer node further collects QoS information for the received data and communicates a QoS information report to a remote node to facilitate QoS-based billing.

12 Claims, 5 Drawing Sheets

SYSTEM AND METHOD FOR DYNAMIC QUALITY-OF-SERVICE-BASED BILLING IN A PEER-TO-PEER NETWORK

FIELD OF THE INVENTION

The present invention relates to techniques for on-line content delivery billing. More specifically, the present invention relates to a system and method for dynamically managing billing for on-line content delivery based on the quality of services rendered in a peer-to-peer overlay network.

BACKGROUND OF THE INVENTION

The ubiquity of Internet connectivity and the unprecedented growth in network access bandwidth have been fueling the demand for more versatile forms of on-line content. Currently, video is one of the most bandwidth-demanding forms of on-line content. Traditionally, video is broadcast over cable programming networks and successful delivery of high-quality video over an Internet connection is subject to several service constraints. Recent technologies, such as ADSL, VDSL, direct Ethernet connection, and WLAN, have largely removed the access bandwidth bottleneck. Server overloading and network congestion, however, can still pose potential service constraints.

Peer-to-peer overlay (P2P) networks have attracted growing interest as one solution to delivering video content. A P2P network operates over a conventional network-layer infrastructure, such as the Internet, and peer nodes are "aware" of the states of other peer nodes. Content delivery is not undertaken by one particular server. Instead, a group of peer nodes directly exchange data or services among themselves. Thus, P2P networks provide a favorable environment for delivering streaming data, such as video, because server overloading is avoided and network congestion is reduced. P2P networks also scale gracefully as the number of users increases.

The successful operation of a P2P network partly depends upon user participation, which is often a function of user satisfaction and quality of service, or QoS. Conventionally, network operators can provide guaranteed QoS using dedicated, tightly-controlled, and over-provisioned network resources, which increases service costs. Customers are required to pay a premium flat fee for high QoS regardless of the amount of the services consumed. For example, a user can be required to pay a flat monthly fee for a 1.5 Mbps leased line service, although the actual service used by the user can vary from month to month. Furthermore, even if the user experiences temporary service degradation, the service provider often charges the same fee.

Additionally, providing guaranteed QoS in a P2P network under the same approach is neither practical nor economical. The advantages of P2P networks are largely attributable to the distributed nature of the architecture, under which central control and network resource allocation are incompatible. In a P2P network, QoS can vary based on a user's location, network condition, and time of service, and a flat fee structure could significantly lower user satisfaction, thereby discouraging user participation.

Hence, a need arises for a dynamic billing system that is based on actually delivered QoS in a P2P network.

SUMMARY OF THE INVENTION

A system and method facilitate dynamic QoS-based billing in a P2P network. According to one embodiment, a peer node identifies a plurality of partner peer nodes that transiently stage streaming media data the peer node requests and receives from the partner peer nodes. The peer node further collects QoS information for the received data and communicates a QoS information report to a remote node to facilitate QoS-based billing.

In a further embodiment, a QoS-based billing system maintains billing accounts for P2P users. The system receives a QoS information report from a peer node associated with a P2P user. The report describes the QoS of streaming media data received by the peer node from a plurality of partner peer nodes. The system debits credits from the P2P user's account based on an amount and QoS level of data received by the peer node.

Still other embodiments will become readily apparent to those skilled in the art from the following detailed description, which describes embodiments of the invention by way of illustrating the best mode contemplated for carrying out the invention. As will be realized, the invention is capable of other and different embodiments and its several details are capable of modifications in various obvious respects, all without departing from the scope of the present invention. Accordingly, the drawings and detailed description are to be regarded as illustrative in nature and not as restrictive.

DETAILED DESCRIPTION

The data structures, operations, and instructions described in the detailed description are typically stored on a computer readable storage medium, which may be any device or medium that can store code or data for use by a computer system. Suitable media include, but are not limited to, application specific integrated circuits (ASICs), field-programmable gate arrays (FPGAs), semiconductor memories, magnetic and optical storage devices such as disk drives, magnetic tape, CDs (compact discs), and DVDs (digital versatile discs or digital video discs). Furthermore, a computer system can be any device or system capable of processing electronically-stored data.

Receiving and Presenting P2P Streaming Media Content

P2P networks can efficiently deliver bandwidth-demanding streaming media, such as audio or video, over the Internet or a wireless cellular network. A node in a P2P network actually shares locally stored data with other peer nodes by exchanging requests and data with other peer nodes. Thus, P2P-based content delivery avoids potential server overload and network congestion by distributing work and content among participating peer nodes.

Figure 1:
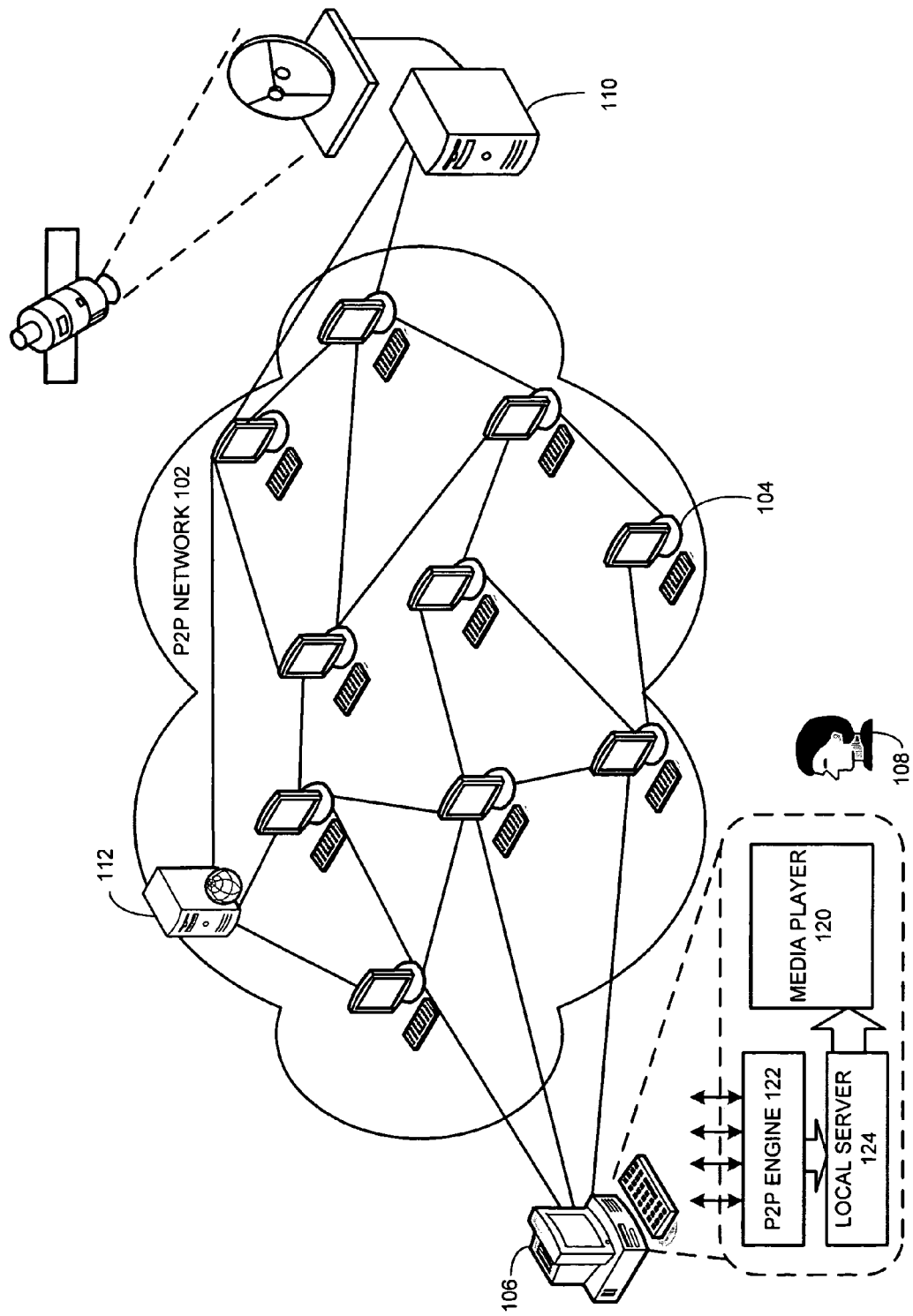
FIG. 1 is a block diagram showing a host facilitating a P2P engine and a local server for presenting streaming media content received over a P2P network.

FIG. 1 is a block diagram showing a host facilitating a P2P engine and a local server for presenting streaming media content received over a P2P network. An originating node 110 is in communication with a satellite base station and receives data for media content. The originating node 110 serves as a content source to other peer nodes within a P2P overlay network 102.

Multiple peer nodes, such as computer 104, collectively form the P2P network 102. A peer node can be any device capable of receiving or transmitting data and participating in a P2P network, such as a cell phone, personal data assistant (PDA), or laptop computer. The P2P network 102 can be formed as a logical layer over an existing network infrastructure, for example, the Internet or a wireless cellular network. The underlying network can be implemented in accordance with the Internet Protocol (IP), such as described in W. R. Stevens, "TCP/IP Illustrated," Vol. 1, Ch. 1 et seq., Addison-Wesley (1994), the disclosure of which is incorporated by reference. Other network infrastructures are possible.

The P2P overlay network 102 uses widely-available one-to-one packet-based communication channels. In a packet-switched IP network, packets are delivered from a source address to a destination address. The P2P overlay network 102 is an application-layer solution based on transport-layer protocols, such as the User Datagram Protocol (UDP) or Transmission Control Protocol (TCP). Other network implementations or protocols are possible. The P2P network 102 uses unicast packet forwarding across participating nodes, called overlay nodes or peer nodes, and provides multicasting by copying and relaying data among the peer nodes. An exemplary peer node is described in X. Zhang et al., "Coolstreaming/DONet: A Data-driven Overlay Network for Peer-to-Peer Live Media Streaming," INFOCOM 2005, 24th Ann. Jt. Conf. of the IEEE Comp. and Comm. Societies, Proc. IEEE Vol. 3, 13-17, pp. 2102-2111 (March 2005), the disclosure of which is incorporated by reference.

The originating node 110 sends media content to neighboring P2P nodes. A directory server 112 maintains a list of peer nodes. In one embodiment, the directory server 112 resides on the same host as the originating node 110. The address of the directory server 112 is universally known within the P2P network 102. When joining the P2P network 102, a new peer node contacts the directory server 112 to request a list of peer nodes that transiently stage content.

The P2P network 102 facilitates delivery of discrete files and streaming media of arbitrary or fixed length. Content includes regular files, streamed files, or media streams of arbitrary lengths. For example, a user can request a live TV channel, video-on-demand (VOD), or data file.

The content passes from node to node via intermediate communication links and propagates to an end host 106, which presents the received media content to an end-user 108. In one embodiment, a P2P engine 122 within the end host 106 is responsible for requesting the list of partner nodes, downloading data from selected partner nodes, and uploading locally stored data to other peer nodes. "Download" denotes the operation of obtaining data from other peer nodes, and "upload" denotes the operation of sending data to other peer nodes. The meaning of "download" and "upload" is thus broader than ordinarily used in a client-server context, which implies only one-to-one sharing.

The P2P engine 122 is in communication with a local server 124 in the end host 106 and shares the received data with a local server 124. The local server 124 channels the received data to the media player 120, which allows the host 106 to use conventional media-presentation applications capable of playing content directly from a location identified, for example, by a Uniform Resource Locator (URL).

Dynamic QoS-based Billing

While receiving streaming media from partner peer nodes, each peer node measures QoS parameters for data received and generates QoS reports that are communicated to the billing system, which operates on one or more nodes. For example, a first node can process the QoS reports and a second node can maintain the billing database. Other configurations of the QoS-based billing system are possible.

Figure 2:
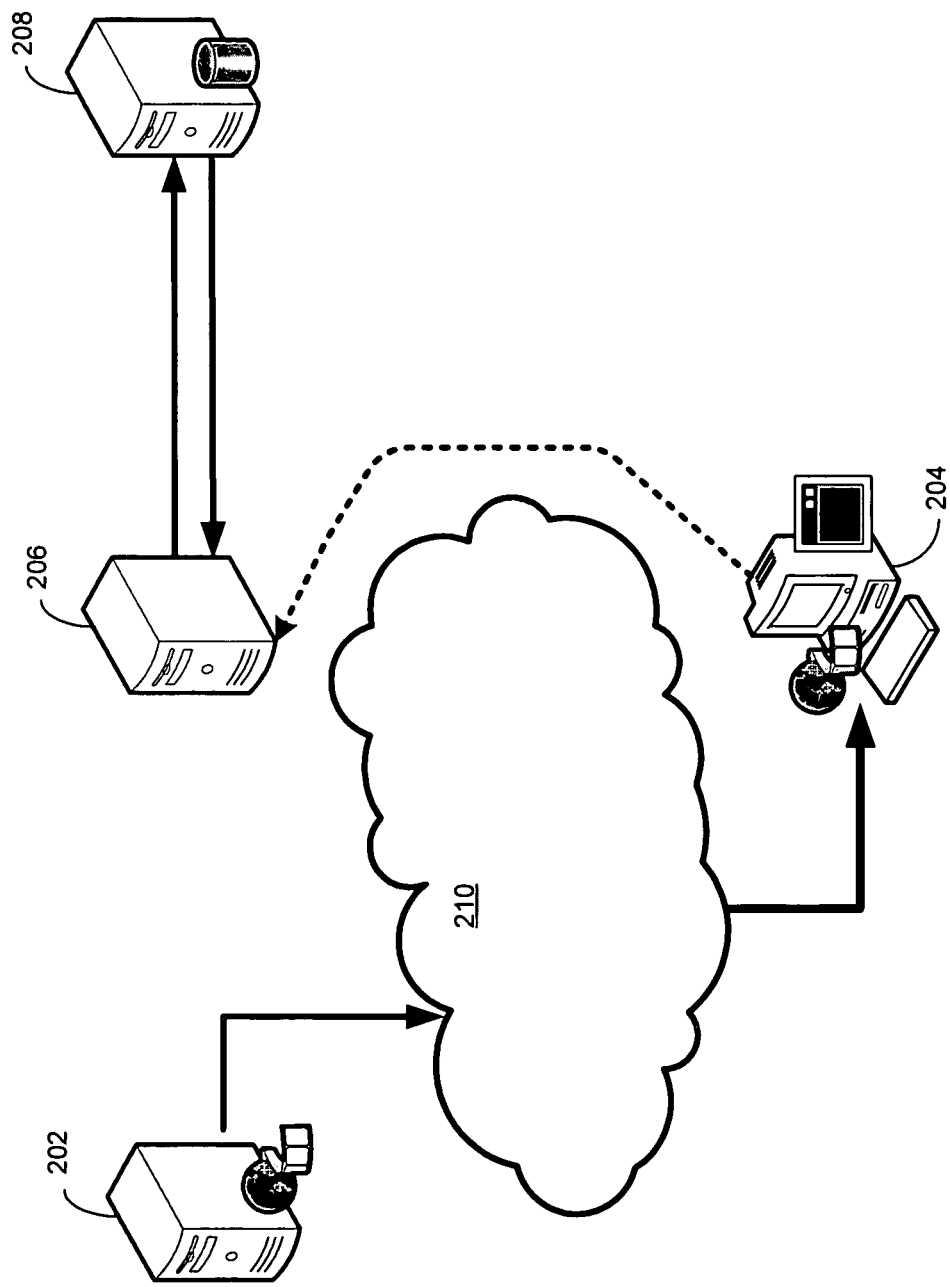
FIG. 2 is a block diagram showing a dynamic QoS-based billing system, in accordance with one embodiment.

FIG. 2 is a block diagram showing a dynamic QoS-based billing system, in accordance with one embodiment. A content source node 202 provides the media content to a P2P network 210. Peer nodes participate in sharing and distributing the media content. A peer node 204 receives a copy of the streaming media in multiple segments. While receiving each segment, the peer node 204 measures QoS. The peer node 204 reports the QoS to a QoS-report processing node 206 over a conventional network, such as the Internet. The QoS-report processing node 206 processes each report and sends billing instructions, such as user account credits and charges, to a billing-database node 208. Billing instructions can also include the amount of data downloaded or uploaded. In a further embodiment, the QoS-report processing node 206 and the billing-database node 208 are one combined.

Measured QoS parameters include, but are not limited to data rate, packet loss rate, segment loss rate, delay variance, and playback latency for real-time streaming. A peer node can measure QoS parameters on different network protocol layers. For example, the peer node can measure the IP packet loss rate on the network layer or transport layer, or the streaming media's segment loss rate on the application (P2P) layer. The peer node can also measure playback-related parameters, such as total playback latency for real-time streaming, through the media presentation software on the application layer.

The peer node measures an average data rate for the streaming media downloaded from partner peer nodes over a set time period. For example, the system can measure the data rate based on the data drawn from a sliding-window buffer. This average data rate reflects the data rate for the media playback and can reflect a user's viewing experience. Typically, the user will enjoy the "best" viewing experience when the measured data rate matches the target data rate intended for the original streaming media. The system can also measure a maximum or minimum data rate, which can assist a network operator in assessing network conditions.

In a further embodiment, the peer node measures a delay variance of packets received from partner peer nodes. The packet delay variance, also referred to as "jitter," estimates data transfer stability between the peer node and a partner node. A peer node can receive data from multiple partner peer nodes for the same streaming media content. Also, the average packet delay for each partner node can vary. The receiving peer node can measure a packet delay variance for each of the partner nodes. The packet delay variance for a partner peer node i, $\sigma_i$, is defined as:

$$\sigma_i = \sqrt{\frac{\sum_{j=1}^{N}(d_j - \bar{d})^2}{N}}$$

where N is a pre-determined number of sample points, which is the number of consecutive packets received from the partner peer node i; $\bar{d}$ is the average delay; j is the index for each packet received; and $d_j$ is the measured delay for the jth received packet.

In a further embodiment, the peer node can determine a weighted average packet delay variance, $\bar{\sigma}$, for all partner peer nodes:

$$\bar{\sigma} = \frac{\sum_{i=1}^{N} W_i \cdot \sigma_i}{M}$$

where i is the index for a partner peer node; M is the number of partner peer nodes; and $W_i$ is the weight assigned to partner peer node i. $W_i$ can be set to the percentage of data received from partner peer node i for a particular media stream. For example, if a peer node respectively receives 20%, 30%, and 50% of a media stream from partner peer nodes 1, 2, and 3, the corresponding weights assigned to those partner peer nodes equal 0.2, 0.3, and 0.5. Other forms of packet delay variance or weight-assignment derivation are possible.

A peer node can also measure a packet loss rate for the streaming media downloaded from partner peer nodes. For example, under the TCP, the system can measure an average IP packet loss rate by tracking missing TCP sequence numbers. Under the UDP, the system can alternatively measure the packet loss rate by placing the equivalent of a sequence number in the payload. Finally, the peer node can measure packet error rate using the checksum in the IP packet header.

In a further embodiment, the peer node measures a segment loss rate for the streaming media. The system can track lost segments when extracting data from a sliding-window buffer and determine an average segment loss rate over a set time period. Depending upon the compression format used, some segments could contain critical frames and be more necessary to ensuring acceptable QoS than other segments. The loss of such critical segments can be detrimental to a user's viewing experience. The system can assign a greater weight to the loss of critical segments when determining average segment loss rate. For example, a media player can detect the loss of a critical segment and signal the QoS measurement mechanism, which increases the measured segment loss rate with extra weight accordingly.

For real-time streaming media, the system can also measure playback latency. Due to the transmission, propagation, and buffering delays, a user might experience playback latency of a media stream, which may negatively affect time-sensitive contents, such as live sports events or news feeds. The system can measure the average playback time latency by comparing the actual time at which a received segment is played against a time stamp included in one or more of the segments. In one embodiment, a sliding-window buffer measures the playback latency of every segment leaving the buffer and performs averaging of the measured latency.

A reporting peer node can include one or more QoS parameters in a report. The reporting peer node can also determine a single numeric QoS indicator based on the measured QoS parameters. Different schemes for determining this indicator are possible. For instance, the system can determine a weighted average, $\bar{Q}$, of M normalized QoS parameters:

$$\bar{Q} = \frac{1}{M} \cdot \sum_{k=1}^{M} (W_k \cdot Q_k)$$

where k is the index of a QoS parameter, $W_k$ is the weight assigned to the kth QoS parameter, and $Q_k$ is the value of the kth normalized QoS parameter.

When the kth QoS parameter is a measured value with a dimension, such as data rate or playback latency, a normalized QoS parameter can be determined. If the ideal value of a QoS parameter has a non-zero value, such as a target data rate, the normalized QoS parameter can be defined as:

$$\frac{|\text{measured value} - \text{target value}|}{\text{target value}}.$$

If the ideal value of the QoS parameter is zero, such as playback latency, the normalized QoS parameter can be defined as:

$$\frac{|\text{measured value}|}{\text{maximum value}}.$$

When the kth QoS parameter is an abstract, dimension-less number and the target value is zero, such as packet loss rate or segment loss rate, the original QoS parameter equals the normalized QoS parameter. For example, the packet loss and segment loss rates can be used as normalized QoS parameters. Other schemes for normalizing QoS parameters are possible.

After receiving a QoS report, the QoS report-processing node 506 determines whether the reported QoS level for the peer node satisfies a pre-determined threshold. If the reported QoS level meets with or exceeds the QoS threshold, the associated user's account maintained in the billing-database node 208 is debited. Otherwise, the billing-database node 208 does not debit the user's account or alternatively rewards the user with credits. In further embodiments, the billing system employs a multi-level billing structure based on the reported QoS level. Other billing structures are possible.

In further embodiments, the QoS-based billing system instructs a peer node to measure specific QoS parameters to enable a network operator to gauge QoS on the P2P network. The billing system sends a message to the measuring peer node, which sends back results in a QoS report. A peer node can also maintain historical QoS data that can be provided upon request. The historical data can be compiled over pre-determined or open time periods.

For security, a peer node can encrypt each QoS report, such as through a public-key infrastructure (PKI).

Figure 3:
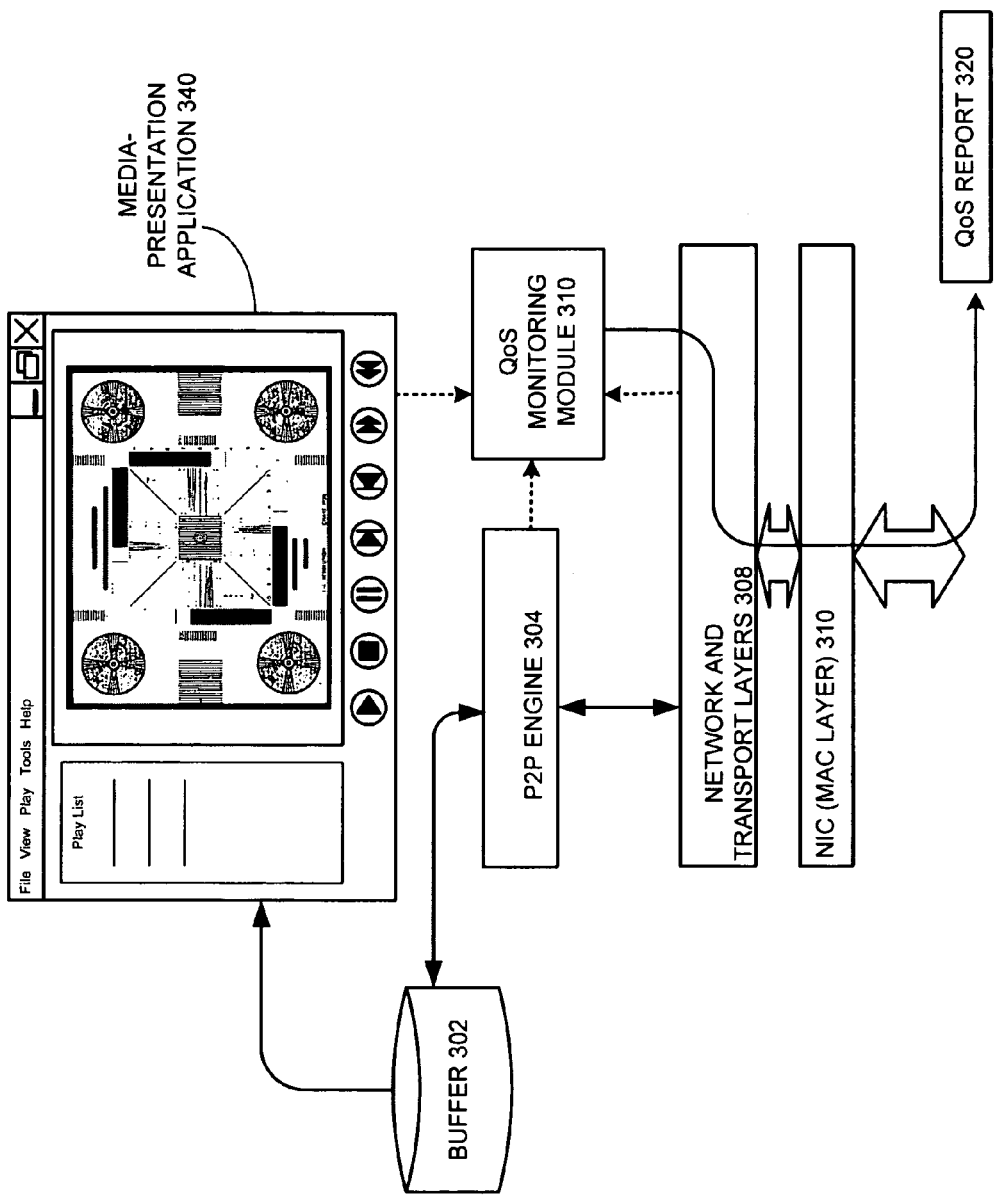
FIG. 3 is a block diagram showing an exemplary architecture of a peer node that supports dynamic QoS-based billing, in accordance with one embodiment.

FIG. 3 is a block diagram showing an exemplary architecture of a peer node that supports dynamic QoS-based billing, in accordance with one embodiment. An end host system includes a network interface card 310 that implements a Medium Access Control (MAC) layer and network and transport layers 308. The end host includes a P2P engine 304 and a buffer 302.

When a user logs onto the P2P application and issues a command to request content from other peer nodes, the P2P engine 304 contacts a directory server to receive a list of partner peer nodes that transiently stage the requested content requested. The P2P engine 304 initializes a P2P session with multiple partner peer nodes to request data. The P2P engine 304 subsequently starts receiving data from the partner peer nodes and stores the received data in the buffer 302. The P2P engine 304 can also retrieve the data stored in the buffer 302 and upload that data to other peer nodes in response to data requests.

The end host further includes a media-presentation application 340 and a QoS monitoring module 310. The QoS monitoring module 310 measures one or more QoS parameters and sends a QoS report 320 to the QoS-based billing system.

Figure 4:
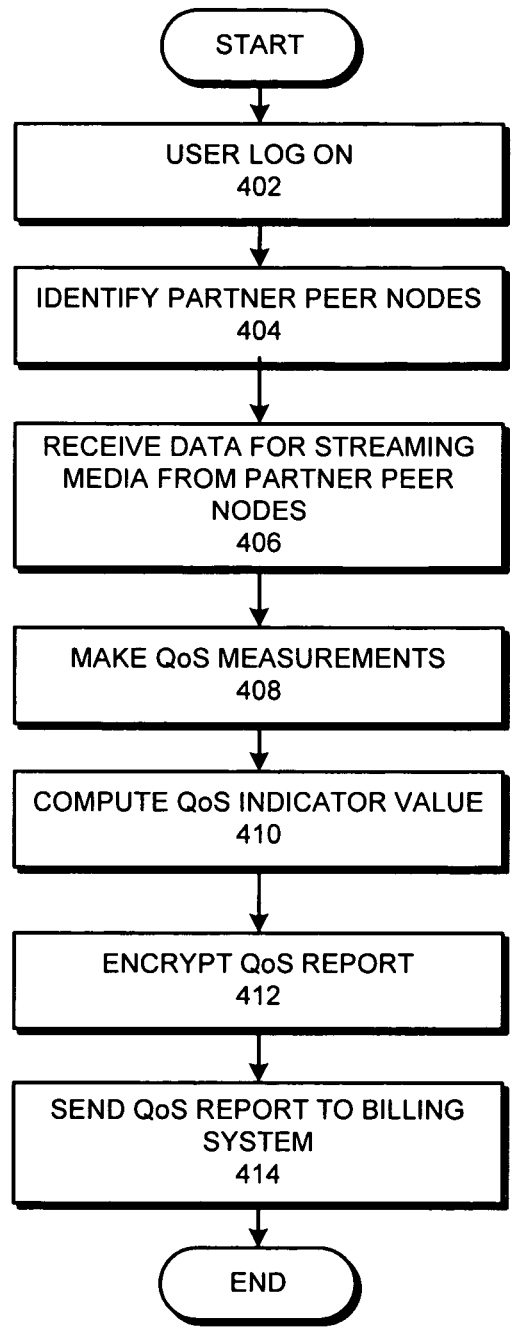
FIG. 4 is a flow chart showing the process of a peer node making QoS measurements and reporting QoS information to a remote billing system, in accordance with one embodiment.

FIG. 4 is a flow chart showing the process of a peer node making QoS measurements and reporting QoS information to a remote billing system, in accordance with one embodiment. After allowing a user to log onto the system (step 402), the peer node identifies the partner peer nodes that transiently stage the streaming media content requested by the user (step 404). In response, the peer node receives data for the streaming media from the partner peer nodes (step 406). During the data transfer, the peer node makes QoS measurements (step 408) and computes a numeric value for the QoS indicator (step 410). The peer node further includes the QoS indicator in a QoS report and encrypts the QoS report (step 412). The peer node subsequently sends the QoS report to the remote billing system (step 414).

Figure 5:
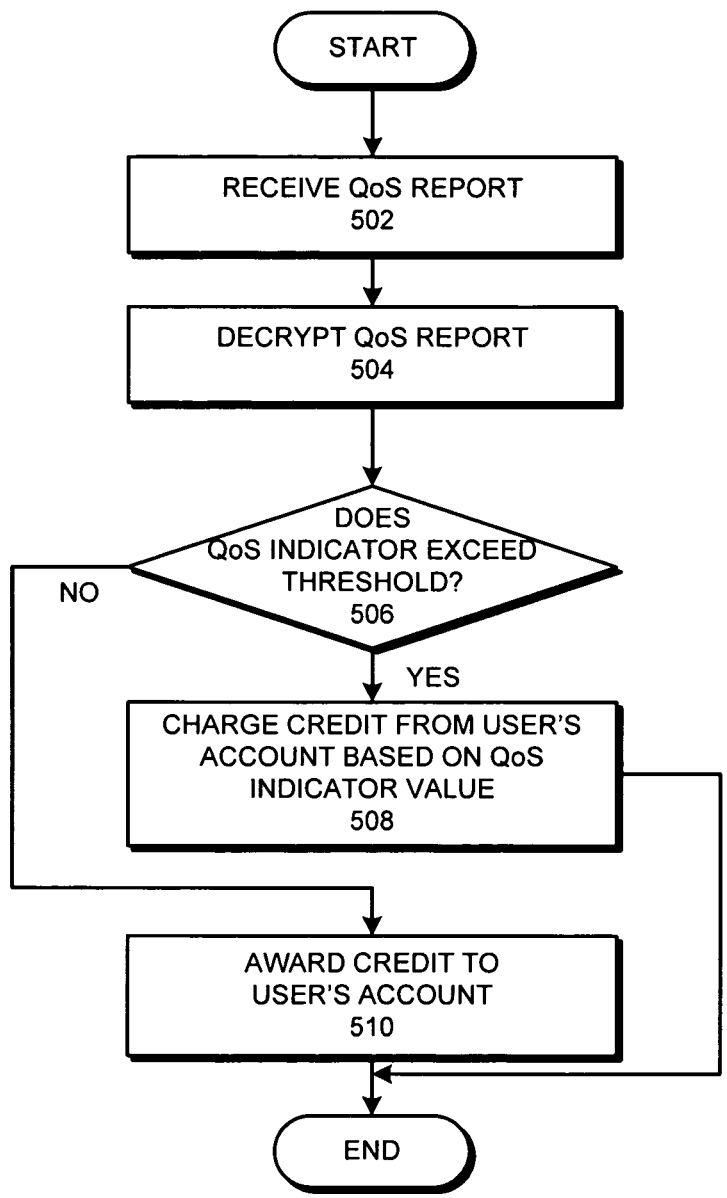
FIG. 5 is a flow chart showing the process of a billing system processing a QoS report and performing corresponding billing actions, in accordance with one embodiment.

FIG. 5 is a flow chart showing the process of a billing system processing a QoS report and performing corresponding billing actions, in accordance with one embodiment. After the billing system receives a QoS report from a peer node (step 502), the system decrypts the QoS report (step 504). If the reported QoS level exceeds a pre-determined QoS threshold (step 506), the billing system debits the user's account based on the QoS indicator value (step 508). Otherwise, the system awards credits to the user's account (step 510).

While the invention has been particularly shown and described as referenced to the embodiments thereof, those skilled in the art will understand that the foregoing and other changes in form and detail may be made therein without departing from the scope of the invention.

What is claimed is:

1. A computer-implemented method for facilitating quality-of-service (QoS)-based billing in a peer-to-peer overlay (P2P) network, the method comprising:
    identifying, by a computing device, a plurality of partner peer nodes in a P2P network that transiently stage subsequently requested streaming media data;
    receiving a plurality of streaming media segments, of the streaming media data, from the plurality of partner peer nodes in the P2P network;
    measuring QoS information including average playback time latency and data rate for the received streaming media data from the plurality of partner peer nodes in the P2P network, wherein the data rate is measured based on the streaming media data drawn from a sliding-window buffer, and wherein measuring the average playback time latency involves:
    determining playback times for the plurality of streaming media segments received from the plurality of partner peer nodes; and
    comparing a playback time of a respective streaming media segment to a timestamp of the streaming media segment, wherein the timestamp indicates an expected playback time for the steaming media segment; and
    communicating a report which indicates a QoS level computed based on the measured QoS information to a billing node, wherein communicating the report to the billing node facilitates the billing node to compare the QoS level in the report against a predefined threshold, to debit a corresponding user account based on the QoS level in response to the QoS level exceeding a predefined threshold, and to credit the corresponding user account in response to the QoS level not exceeding the predefined threshold.

2. The method of claim 1, wherein measuring QoS information for the received data comprises one or more of:
    measuring a maximum data rate;
    measuring a minimum data rate;
    measuring an average data rate;
    measuring a delay variance of received packets;
    measuring a packet loss rate;
    measuring a packet error rate;
    measuring a segment loss rate; and
    measuring a playback latency for real-time streaming.

3. The method of claim 1, further comprising:
    determining a value to indicate QoS information for the received data; and
    including the value in the report.

4. The method of claim 1, further comprising:
    maintaining historical QoS data based on the collected QoS information.

5. The method of claim 1, further comprising:
    receiving a request which specifies one or more QoS metrics; and
    including a value corresponding to the specified QoS metric in the report based on the collected QoS information.

6. The method of claim 1, further comprising:
    encrypting the report.

7. A system for facilitating quality-of-service (QoS)-based billing in a peer-to-peer overlay (P2P) network, the system comprising:
    a processor;
    a P2P engine, coupled to the processor, configured to identify a plurality of partner peer nodes in a P2P network that transiently stage subsequently requested streaming media data;
    a receiving mechanism configured to receive a plurality of streaming media segments, of the streaming media data, from the plurality of partner peer nodes in the P2P network;
    a QoS monitoring mechanism configured to measure QoS information including average playback time latency and data rate for the received streaming media data from the plurality of partner peer nodes in the P2P network, wherein the data rate is measured based on the streaming media data drawn from a sliding-window buffer, and wherein measuring the average playback time latency involves:
    determining playback times for the plurality of streaming media segments received from the plurality of partner peer nodes; and
    comparing a playback time of a respective streaming media segment to a timestamp of the streaming media segment, wherein the timestamp indicates an expected playback time for the steaming media segment; and
    a QoS reporting mechanism configured to communicate a report which indicates a QoS level computed based on the measured QoS information to a billing node, wherein communicating the report to the billing node facilitates the billing node to compare the QoS level in the report against a predefined threshold, to debit a corresponding user account based on the QoS level in response to the QoS level exceeding a predefined threshold, and to credit the corresponding user account in response to the QoS level not exceeding the predefined threshold.

8. The system of claim 7, wherein while measuring QoS information for the received data, the QoS monitoring mechanism is configured to measure one or more of:
    a maximum data rate;
    a minimum data rate;
    an average data rate;
    a delay variance of received packets;
    a packet loss rate;

a packet error rate;
a segment loss rate; and
a playback latency for real-time streaming.

9. The system of claim 7, further comprising:
a determination mechanism configured to determine a value to indicate QoS information for the received data;
wherein the QoS reporting mechanism is configured to include the value in the report.

10. The system of claim 7, wherein the QoS monitoring mechanism is configured to:
maintain historical QoS data based on the collected QoS information.

11. The system of claim 7, further comprising:
a receiving mechanism configured to receive a request which specifies one or more QoS metrics; wherein the QoS reporting mechanism is configured to include a value corresponding to the specified QoS metric in the report based on the collected QoS information.

12. The system of claim 7, further comprising:
an encryption mechanism configured to encrypt the report.

* * * * *